United States Patent
Shibanuma et al.

(10) Patent No.: US 8,318,039 B2
(45) Date of Patent: Nov. 27, 2012

(54) REFRIGERANT COMPOSITION COMPRISING 1,1,1,2-TETRAFLUOROETHANE (HFC134A) AND 2,3,3,3-TETRAFLUOROPROPENE (HFO1234YF)

(75) Inventors: Takashi Shibanuma, Settsu (JP); Tatsumi Tsuchiya, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/001,867

(22) PCT Filed: Jun. 30, 2009

(86) PCT No.: PCT/JP2009/062249
§ 371 (c)(1),
(2), (4) Date: Dec. 29, 2010

(87) PCT Pub. No.: WO2010/002020
PCT Pub. Date: Jan. 7, 2010

(65) Prior Publication Data
US 2011/0108757 A1      May 12, 2011

Related U.S. Application Data

(60) Provisional application No. 61/129,500, filed on Jul. 1, 2008.

(51) Int. Cl.
*C09K 5/04* (2006.01)

(52) U.S. Cl. .................................................. 252/67

(58) Field of Classification Search ............ 252/67
See application file for complete search history.

(56) References Cited

U.S. PATENT DOCUMENTS

| | | | |
|---|---|---|---|
| 2005/0245421 A1 | 11/2005 | Singh et al. | |
| 2005/0247905 A1 | 11/2005 | Singh et al. | |
| 2006/0243945 A1* | 11/2006 | Minor et al. | 252/67 |
| 2008/0308763 A1 | 12/2008 | Singh et al. | |
| 2009/0314015 A1* | 12/2009 | Minor et al. | 62/115 |
| 2010/0025619 A1* | 2/2010 | Riva et al. | 252/67 |

FOREIGN PATENT DOCUMENTS

| | | |
|---|---|---|
| WO | 2005/105947 A2 | 11/2005 |
| WO | 2005/105947 A3 | 11/2005 |
| WO | 2005/108522 A1 | 11/2005 |
| WO | 2006/094303 A2 | 9/2006 |
| WO | 2006/094303 A3 | 9/2006 |
| WO | 2007/002625 A2 | 1/2007 |
| WO | 2007/002625 A3 | 1/2007 |
| WO | 2007/126414 A2 | 11/2007 |
| WO | 2007/126414 A3 | 11/2007 |
| WO | 2008/027555 A2 | 3/2008 |
| WO | 2008/027555 A3 | 3/2008 |

OTHER PUBLICATIONS

International Search Report issued Oct. 6, 2009 in International (PCT) Application No. PCT/JP2009/062249.

PCT Written Opinion of the International Searching Authority issued Oct. 6, 2009 in International (PCT) Application No. PCT/JP2009/062249.

* cited by examiner

*Primary Examiner* — John Hardee
(74) *Attorney, Agent, or Firm* — Wenderoth, Lind & Ponack, L.L.P.

(57) ABSTRACT

The present invention provides a non-flammable refrigerant, which is excellent in handleability while retaining the refrigerating capacity. Specifically, the present invention relates to a refrigerant composition comprising 36 to 50 mass % of 1,1,1,2-tetrafluoroethane (HFC134a) and 50 to 64 mass % of 2,3,3,3-tetrafluoropropene (HFO1234yf).

9 Claims, 1 Drawing Sheet

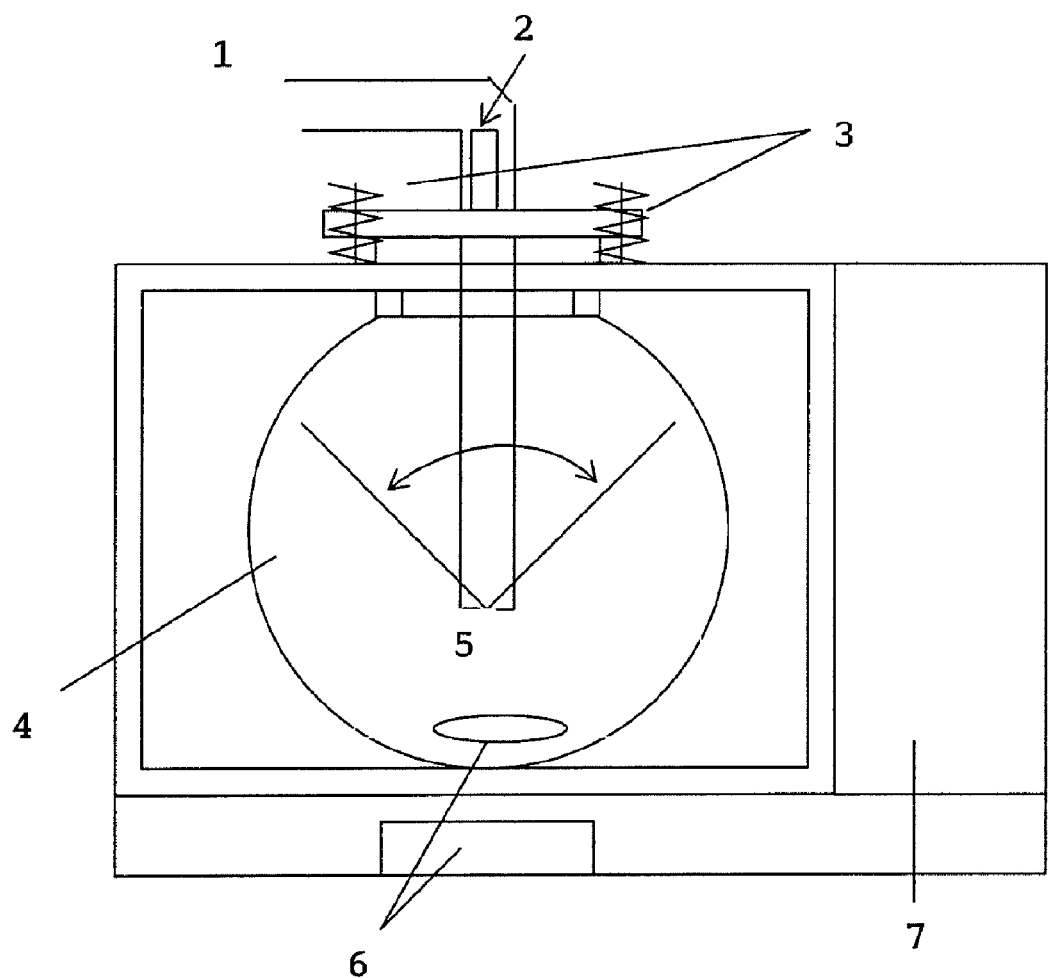

REFRIGERANT COMPOSITION COMPRISING 1,1,1,2-TETRAFLUOROETHANE (HFC134A) AND 2,3,3,3-TETRAFLUOROPROPENE (HFO1234YF)

This application claims the benefit of U.S. Provisional Application No. 61/129,500 filed Jul. 1, 2008.

TECHNICAL FIELD

The present invention relates to a mixed refrigerant composition containing 1,1,1,2-tetrafluoroethane (HFC134a) and 2,3,3,3-tetrafluoropropene (HFO1234yf) for use in refrigeration and air-conditioning systems.

BACKGROUND ART

With global warming becoming an increasingly serious issue worldwide, the development of environmentally friendly refrigeration and air-conditioning systems has become increasingly important. Refrigerants have a great influence not only on global warming, but also on the performance of refrigeration and air-conditioning systems. Therefore, the selection of a refrigerant has an important role in reducing carbon dioxide emissions that contribute to global warming.

Recently, various partially-fluorinated propenes having a double bond in the molecule, with a lower global warming potential (GWP) than known chlorofluorocarbons (CFCs), hydrochlorofluorocarbons (HCFCs), and hydrofluorocarbons (HFCs), have been proposed.

2,3,3,3-Tetrafluoropropene (HFO1234yf) is one such propene (see, for example, Patent Literatures 1 and 2). This refrigerant is flammable, and ignites at a concentration of 6.5 to 12.5 vol. % in air at 21° C.

CITATION LIST

Patent Literature

PTL 1: WO2005/105947
PTL 2: WO2006/094303

SUMMARY OF INVENTION

Technical Problem

When the refrigerant is flammable, the use of a highly safe material in the electrical system is required, and an upper limit is set on the amount of the refrigerant to be charged into an apparatus. An object of the present invention is to provide a non-flammable refrigerant, which is excellent in handleability and free from the above requirements, while retaining the refrigerating capacity.

Solution to Problem

The inventors of the present invention carried out extensive research in view of the above problems and found that the problems can be solved by using a refrigerant composition containing 36 to 50 mass % of 1,1,1,2-tetrafluoroethane (HFC134a) and 50 to 64 mass % of 2,3,3,3-tetrafluoropropene (HFO1234yf), and preferably 36 to 42 mass % of HFC134a and 58 to 64 mass % of HFO1234yf in an apparatus in which the refrigerant is circulated through a compressor to form a refrigeration cycle. The present invention has been accomplished based on the above finding.

Specifically, the present invention provides the following non-flammable refrigerant composition.

Item 1. A refrigerant composition comprising 36 to 50 mass % of 1,1,1,2-tetrafluoroethane (HFC134a) and 50 to 64 mass % of 2,3,3,3-tetrafluoropropene (HFO1234yf).

Item 2. The refrigerant composition according to Item 1 comprising 36 to 42 mass % of 1,1,1,2-tetrafluoroethane (HFC134a) and 58 to 64 mass % of 2,3,3,3-tetrafluoropropene (HFO1234yf).

Item 3. The refrigerant composition according to Item 1 or 2, which further comprises a polymerization inhibitor.

Item 4. The refrigerant composition according to any one of Items 1 to 3, which further comprises a drying agent.

Item 5. The refrigerant composition according to any one of Items 1 to 4, which further comprises a stabilizer.

Item 6. A method of operating a refrigerator comprising circulating the refrigerant composition according to any one of Items 1 to 5 through a compressor.

Item 7. A method of producing the refrigerant composition according to Item 1 comprising mixing 36 to 50 mass % of 1,1,1,2-tetrafluoroethane (HFC134a) with 50 to 64 mass % of 2,3,3,3-tetrafluoropropene (HFO1234yf).

Item 8. A refrigerator comprising the refrigerant composition according to any one of Items 1 to 5.

Advantageous Effects of Invention

The following effects can be achieved by the refrigerant composition of the present invention.
(1) The refrigerant composition of the invention achieves the same or improved cycle performance compared to a newly proposed HFO1234yf when used as a refrigerant for a heat pump apparatus.
(2) The refrigerant composition of the invention is non-flammable. Therefore, modification of the apparatus specification, such as the use of a highly safe material, is unnecessary.
(3) The refrigerant composition of the invention has no ozone depletion potential (ODP); therefore, it does not contribute to ozone layer depletion, even when not completely collected after use.

BRIEF DESCRIPTION OF DRAWINGS

FIG. 1 is a configuration view of the apparatus used in a flammability test.

DESCRIPTION OF EMBODIMENTS

The present inventors conducted extensive research on the relationship between the flammability and the mixing ratios of HFO1234yf with a flammable range and HFC134a without a flammable range. The flammability is evaluated in accordance with the method described in Test Example 2.

As a result, they found that the refrigerant composition containing 36 to 50 mass % of HFC134a and 50 to 64 mass % of HFO1234yf (the refrigerant composition containing HFC134a/HFO1234yf at a ratio of 36/64 to 50/50 mass %) is non-flammable while retaining refrigerating capacity. Further, the refrigerant composition containing 36 to 42 mass % of HFC134a and 58 to 64 mass % of HFO1234yf (the refrigerant composition containing HFC134a/HFO1234yf at a ratio of 36/64 to 42/58 mass %) achieves more excellent effects, and the refrigerant composition containing 38 to 42 mass % of HFC134a and 58 to 62 mass % of HFO1234yf (the refrigerant composition containing HFC134a/HFO1234yf at a ratio of 38/62 to 42/58 mass %) achieves most excellent effects.

HFC134a has a GWP (Integration Time Horizon; ITH=100 yr) of 1,430, while the GWP of HFO1234yf is 4. When the content of HFC134a in the mixed refrigerant becomes 36 to 50 mass, the mixed refrigerant has a GWP less than about half that of HFC134a alone.

The non-flammable composition of the invention has high stability. If necessary, stabilizers may be added to meet the requirement of high stability under severe conditions.

Examples of such stabilizers include (i) aliphatic nitro compounds such as nitromethane and nitroethane; and aromatic nitro compounds such as nitrobenzene and nitrostyrene; (ii) ethers such as 1,4-dioxane; and amines such as 2,2,3,3,3-pentafluoropropylamine and diphenylamine; butylhydroxyxylene, benzotriazole, etc. The stabilizers can be used singly or in a combination of two or more.

The amount of stabilizer may vary depending on the type of stabilizer as long as it does not impair the performance of the non-flammable composition. In general, the amount of stabilizer is preferably about 0.1 to about 10 parts by weight, and more preferably about 0.1 to about 5 parts by weight, per 100 parts by weight of the mixture of HFC134a and HFO1234yf.

The composition of the present invention may further contain a polymerization inhibitor. Examples thereof include 4-methoxy-1-naphthol, hydroquinone, hydroquinonemethyl ether, dimethyl-t-butyl phenol, 2,6-di-tert-butyl-p-cresol, benzotriazole, etc.

In general, the amount of polymerization inhibitor is preferably about 0.01 to about 5 parts by weight, and more preferably about 0.05 to about 2 parts by weight, per 100 parts by weight of the mixture of HFC134a and HFO1234yf.

The composition of the present invention may further contain a drying agent.

A refrigeration cycle can be formed by circulating the refrigerant composition of the present invention through a compressor. It is also possible to produce an apparatus for forming a refrigeration cycle in which the refrigerant composition of the present invention is circulated through a compressor.

Examples of refrigerating systems capable of using the refrigerant composition of the invention include, but are not limited to, car air-conditioners, refrigerating units for automatic vending machines, industrial/household air-conditioners, gas heat pumps (GHP)/electrical heat pumps (EHP), etc.

EXAMPLES

The present invention will be described in more detail below by way of Examples; however, the invention is not limited thereto.

Test Example 1

As refrigerants, HFC134a and HFO1234yf were used in the following ratio (HFC134a/HFO1234yf): 40/60 mass % in Example 1, and 50/50 mass % in Example 2. Using a heat pump apparatus with a rated cooling capacity of 4 kW, operation was conducted at an evaporating temperature of the refrigerant in the evaporator of 10° C., a condensing temperature of the refrigerant in the condenser of 45° C., and degrees of superheat and subcool of 0° C. For comparison, the heat pump apparatus was operated using HFO1234yf (Comparative Example 1) under the same conditions as above, except for setting the degree of superheat at 2.4° C.

Based on the above results, the coefficient of performance (COP) and refrigerating effect were obtained using the following formulae.

COP=cooling capacity/power consumption

Refrigerating effect=cooling capacity/refrigerant circulation quantity

Table 1 shows the COP and refrigerating effect of the refrigerants used in Examples 1 and 2 relative to those of the refrigerant used in Comparative Example 1 (=100).

TABLE 1

|   |   | COP Ratio | Refrigerating Effect Ratio | Evaporating Pressure (MPa) | Condensing Pressure (MPa) |
|---|---|---|---|---|---|
| Example 1 | HFC134a/ HFO1234yf (40/60 mass %) | 101 | 110 | 0.46 | 1.22 |
| Example 2 | HFC134a/ HFO1234yf (50/50 mass %) | 101 | 111 | 0.46 | 1.23 |
| Comparative Example 1 | HFO1234yf | 100 | 100 | 0.43 | 1.23 |

Test Example 2

The flammability of the mixed refrigerants forming the present refrigerant was evaluated by measuring the flammable range using a measurement apparatus in accordance with ASTM E681-2001. See FIG. 1.

A 12 L spherical glass flask was used so that the combustion state can be visually observed and photographically recorded on video. During the generation of excessive pressure by combustion, gas was allowed to escape from an upper lid. Ignition was achieved by discharge from electrodes placed at one-third of the distance from the bottom.

| Test vessel: 280 mm Φ spherical (Internal volume: 12 liters) | |
|---|---|
| Test temperature: 60° C. | ±3° C. |
| Pressure: 101.3 kPa | ±0.7 kPa |
| Water: 0.0088 g per gram of dry air | ±0.0005 g |
| Mixing ratio of refrigerant/air: 1 vol. % increments | ±0.2 vol. % |
| Refrigerant mixture: | ±0.1 mass % |
| Ignition method: AC discharge | |
| Electrode interval: 6.4 mm (¼ inch) | |
| Spark: 0.4 sec. | ±0.05 sec. |

Evaluation criteria: When a flame extends at an angle of 90° or more from the ignition point, it was evaluated as flammable (propagation).

Table 2 shows the flammability evaluation results of the mixed HFC134a and HFO1234yf. The results reveal that the boundary between non-flammable and flammable is established when the ratio of HFC134a/HFO1234yf is 36/64 mass, and that the composition containing 36 mass % or more of HFC134a is non-flammable, even when mixed with air at any ratio. Therefore, it is relevant that the refrigerant of the present invention is non-flammable.

TABLE 2

| Concentration of HFC134a in mixed gas | Concentration of mixed gas in air | | | | |
|---|---|---|---|---|---|
| | 7 vol. % | 8 vol. % | 9 vol. % | 10 vol. % | 11 vol. % |
| 34 mass % | Non-flammable | Non-flammable | Flammable | Non-flammable | Non-flammable |
| 35 mass % | Non-flammable | Non-flammable | Flammable | Non-flammable | Non-flammable |
| 36 mass % | Non-flammable | Non-flammable | Non-flammable | Non-flammable | Non-flammable |

INDUSTRIAL APPLICABILITY

The mixed refrigerant composition of the present invention is effective as a refrigerant composition for refrigeration and air-conditioning systems.

REFERENCE SIGNS LIST

| 1 | Ignition source |
| 2 | Sample inlet |
| 3 | Springs |
| 4 | 12-Liter glass flask |
| 5 | Electrodes |
| 6 | Stirrer |
| 7 | Insulated chamber |

The invention claimed is:

1. A composition comprising refrigerants, wherein the refrigerants consist of 36 to 50 mass % of 1,1,1,2-tetrafluoroethane (HFC134a) and 50 to 64 mass % of 2,3,3,3-tetrafluoropropene (HFO1234yf).

2. The composition according to claim 1, wherein the refrigerants consist of 36 to 42 mass % of 1,1,1,2-tetrafluoroethane (HFC134a) and 58 to 64 mass % of 2,3,3,3-tetrafluoropropene (HFO1234yf).

3. The composition according to claim 1, which further comprises a polymerization inhibitor.

4. The composition according to claim 1, which further comprises a drying agent.

5. The composition according to claim 1, which further comprises a stabilizer.

6. A method of operating a refrigerator having a compressor comprising circulating the composition according to claim 1 through the compressor.

7. A method of producing the composition according to claim 1 comprising mixing 36 to 50 mass % of 1,1,1,2-tetrafluoroethane (HFC134a) with 50 to 64 mass % of 2,3,3,3-tetrafluoropropene (HFO1234yf).

8. A refrigerator comprising the composition according to claim 1.

9. The composition according to claim 1, wherein the composition is nonflammable.

* * * * *